United States Patent
Yang et al.

(10) Patent No.: US 8,229,601 B2
(45) Date of Patent: Jul. 24, 2012

(54) DCS CONTROL MODULE FOR A TRANSFORMER IN NUCLEAR POWER ENGINEERING

(75) Inventors: Li Yang, Guangzhou (CN); Hongjian Tang, Guangzhou (CN); Shaoyong Wang, Guangzhou (CN); Li Sha, Guangzhou (CN); Huamin Chen, Guangzhou (CN); Chuangshu Xie, Guangzhou (CN); Jingshan Liu, Guangzhou (CN)

(73) Assignee: Guangdong Electric Power Design Institute, Guangzhou (CN)

( * ) Notice: Subject to any disclaimer, the term of this patent is extended or adjusted under 35 U.S.C. 154(b) by 179 days.

(21) Appl. No.: 12/839,798

(22) Filed: Jul. 20, 2010

(65) Prior Publication Data

US 2011/0046807 A1    Feb. 24, 2011

Related U.S. Application Data

(63) Continuation of application No. PCT/CN2009/000951, filed on Aug. 19, 2009.

(30) Foreign Application Priority Data

Dec. 31, 2008 (CN) .................... 2008 2 0206594 U

(51) Int. Cl.
*G05D 3/12* (2006.01)
(52) U.S. Cl. ................... 700/292; 700/293; 361/18
(58) Field of Classification Search .................. 700/292, 700/286, 293; 361/18, 93.2, 189; 324/500; 60/646

See application file for complete search history.

(56) References Cited

U.S. PATENT DOCUMENTS

| | | | | |
|---|---|---|---|---|
| 5,055,703 A | * | 10/1991 | Schornack | 307/64 |
| 6,222,714 B1 | * | 4/2001 | Hoffman | 361/93.2 |
| 6,337,788 B1 | * | 1/2002 | Balakrishnan et al. | 361/86 |
| 7,027,896 B2 | * | 4/2006 | Thompson | 700/292 |
| 7,446,988 B2 | * | 11/2008 | Balakrishnan et al. | 361/18 |
| 7,636,615 B2 | * | 12/2009 | Pfingsten et al. | 700/286 |
| 2010/0010684 A1 | * | 1/2010 | Lorenz et al. | 700/293 |
| 2010/0277838 A1 | * | 11/2010 | Balakrishnan et al. | 361/18 |
| 2010/0292857 A1 | * | 11/2010 | Bose et al. | 700/292 |

FOREIGN PATENT DOCUMENTS

| | | |
|---|---|---|
| CN | 2914163 | 6/2007 |
| CN | 2924742 | 7/2007 |
| JP | 8-19126 | 1/1996 |

OTHER PUBLICATIONS

International Search Report of PCT/CN2009/000951, dated Dec. 3, 2009.

\* cited by examiner

*Primary Examiner* — Dave Robertson
(74) *Attorney, Agent, or Firm* — Hamre, Schumann, Mueller & Larson, P.C.

(57) ABSTRACT

A distribution control system (DCS) control module for a transformer in nuclear power engineering, includes: an input command processing logic unit (1), a malfunction processing logic unit (2), a state processing logic unit (3), an output command generating logic unit (4) and a 6.6 kV switchgear of the transformer. The DCS control module utilizes the DCS integral with the power units to realize the control of 6.6 kV transformer switch, the sharing of the operator station with the power unit control system, and the overall monitoring, and the operation reliability of the power units is improved.

5 Claims, 3 Drawing Sheets

DCS CONTROL MODULE FOR A TRANSFORMER IN NUCLEAR POWER ENGINEERING

FIELD OF THE INVENTION

The present invention relates to the field of electrical equipment, and in particular to a DCS (Distributed Control System) control module for a transformer in nuclear power engineering adapted to be used for controlling the 6.6 kV switchgear of the transformer used in nuclear power plant.

BACKGROUND OF THE INVENTION

In the nuclear power plant, the reliability in controlling the 6.6 kV switchgear of the transformer is essential to the safe operation of the 6.6 kV auxiliary power system, the 380V auxiliary power system and the nuclear power units, and also to the safe operation of the nuclear island. In the prior art, the 6.6 kV switchgear of the transformer is controlled by the relay control device in the switchgear, including the intermediate relay, the protective current relay and the voltage relay, and the switching-through intermediate relay mounted on the relay rack, the control switch, the measurement apparatuses and the cable mounted in the control room, to realize the controlling, interlock, measurement and monitoring of the switch. It is complicated in connection, low in reliability, difficult in maintenance and low in efficiency, while many operators are needed for maintenance such that the cost of operation is increased.

SUMMARY OF THE INVENTION

It is an object of the present invention to provide a switch control module for a transformer in the nuclear power plant, which solves the above problems of low reliability, difficult maintenance, low efficiency, high cost in operation and the needing of many operators for maintenance in the 6.6 kV switch control circuit of the transformer in the nuclear power plant.

The above object may be achieved by the following technical solution:

A DCS control module for a transformer in nuclear power engineering comprises an input command processing logic unit, a malfunction processing logic unit, a state processing logic unit, an output command generating logic unit, a 6.6 kV switchgear of the transformer and the DCS man-machine interfaces. Three input ends of the input command processing logic unit respectively receive the malfunction signal of the 6.6 kV switchgear of the transformer, the blocking signal and the operator interface signal. Two output ends of the input command processing logic unit are respectively connected to an input end of the malfunction processing logic unit and an input end of the output command generating logic unit. The malfunction processing logic unit has three input ends respectively connected to an output end of the state processing logic unit, state processing logic unit and an output end of the output command generating logic unit, and has two output ends respectively connected to an input end of the output command generating logic unit and the alarm end of the operator interface. The state processing logic unit has an input end receiving the state feedback signal of the position of 6.6 kV switch of the transformer, and an output end connected to the display end of the operator interface. The output command generating logic unit has an output end connected to the control command signal end of the 6.6 kV switchgear of the transformer.

Preferably, the input command processing logic unit is constituted by connecting AND gate chips IC1, IC2 and IC3 and an OR gate chip I1. The malfunction processing logic unit is constituted by connecting AND gate chips IC5 and IC6, an OR gate chip I4, R/S triggers Q1 and Q2, and delay chips T1 and T2. The state processing logic unit is constituted by connecting AND gate chips IC7 and IC8, and OR gate chips I2, I3. The output command generating logic unit is constituted by connecting an AND gate chip IC4 and an OR gate chip I5. The malfunction signal of the 6.6 kV switchgear of the transformer is connected to the input end of the gate I1, and two output ends of the gate I1 are respectively connected to the input end of the I5, the input end of the IC4, and the input end of the I4. The blocking signal is connected to the input ends of the IC3, IC4, IC5 and IC6. The operator interface signal is connected to the input ends of the IC2, IC3 and IC4. Several state feedback signals of the position of the 6.6 kV switch of the transformer are respectively connected to the input ends of the I2, I3, IC7 and IC8. The output ends of the I5 and IC4 are connected to the control command signal end of the 6.6 kV switchgear of the transformer. The output ends of the Q1, Q2 and I4 are connected to the alarm end of the operator interface. The output ends of the IC7 and I3 are connected to the display end of the operator interface.

Preferably, the malfunction signal of the 6.6 kV switchgear of the transformer may include a transformer overload protection action signal, a trip signal of the high voltage fuse of the transformer, a zero-sequence protection action signal of transformer cable, a zero-sequence protection action signal of neutral point of transformer, and a disconnecting signal of the trip connection piece. The blocking signal may include an open signal and a close signal. The operator interface signal may include a remote position signal of the remote/local control switch and a DCS control signal.

Preferably, the state feedback signal of the position of 6.6 kV switch of the transformer may include a switch-on signal of the transformer switch, a working position signal of the transformer switch, a signal representative of the test switch of the transformer switch being in test position, a switch-off signal of the transformer switch, a signal representative of the transformer switch being in test position, and a signal representative of the test switch of the transformer switch being in normal position.

Preferably, the control command signal end of the 6.6 kV switchgear of the transformer includes a switch-on signal and a switch-off signal.

With the present invention, the following advantages are obtained:

1. the present invention is adapted to be used for controlling the 6.6 kV switchgear of the transformer used in nuclear power plant, and utilizes the DCS integral with the power units to realize the control of 6.6 kV transformer switch, the sharing of the operator station with the power unit control system, and the overall monitoring, and the operation reliability of the power units is improved;

2. for the DCS integral with the power units being used in the present invention, the automation degree is greatly improved, and the number of the maintenance operator can be reduced while the effect of operation is improved, which therefore reduces the costs of using and maintenance.

DETAILED DESCRIPTION OF THE PREFERRED EMBODIMENT

Figure 1:
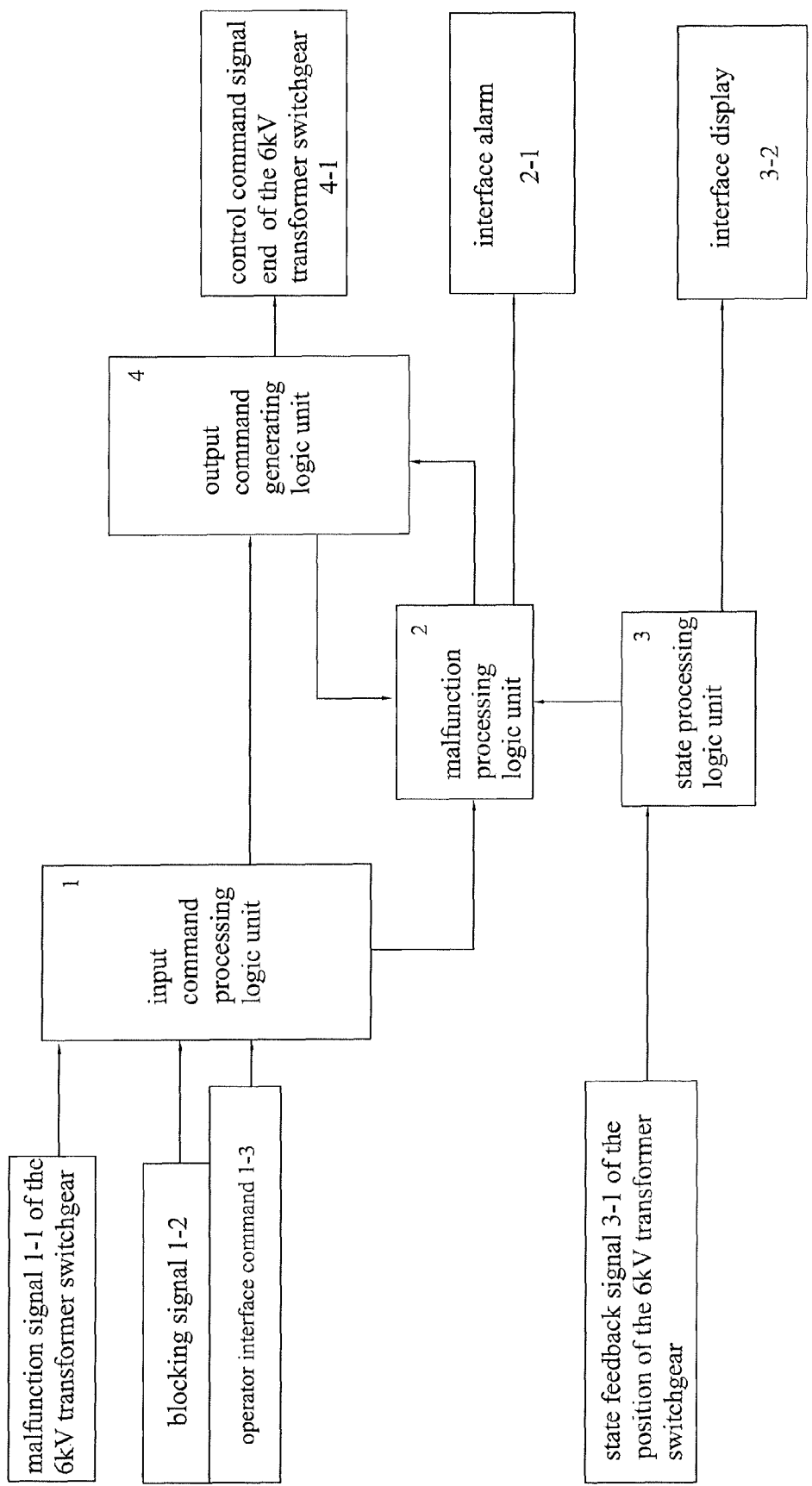
FIG. 1 is a logic block diagram of the present invention.

Referring to FIG. 1, the DCS control module for a transformer in nuclear power engineering comprises an input command processing logic unit 1, a malfunction processing logic unit 2, a state processing logic unit 3, an output command generating logic unit 4 and a 6.6 kV switchgear of the transformer. Three input ends of the input command processing logic unit 1 respectively receive the malfunction signal 1-1, the blocking signal 1-2 and the operator interface signal 1-3 of the 6.6 kV switchgear of the transformer. Two output ends of the input command processing logic unit 1 are respectively connected to an input end of the malfunction processing logic unit 2 and an input end of the output command generating logic unit 4. The malfunction processing logic unit 2 has two input ends respectively connected to an output end of the state processing logic unit 3 and an output end of the output command generating logic unit 4, and has two output ends respectively connected to an input end of the output command generating logic unit 4 and the alarm end of the operator interface 2-1. The state processing logic unit 3 has an input end receiving the state feedback signal 3-1 of the position of 6.6 kV switch of the transformer, and an output end connected to the display end of the operator interface 3-2. The output command generating logic unit 4 has an output end connected to the control command signal end 4-1 of the 6.6 kV switchgear of the transformer.

Figure 2:
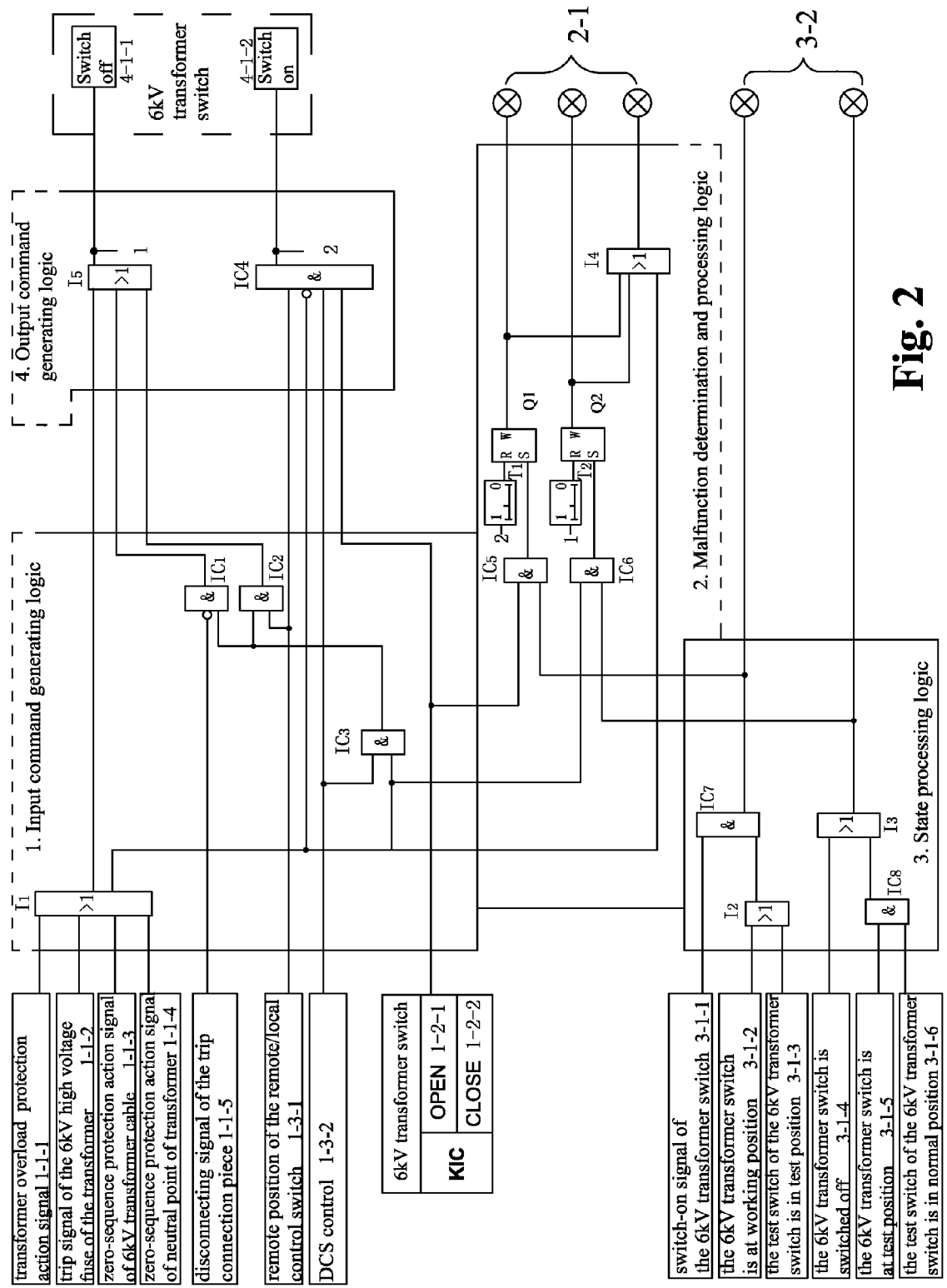
FIG. 2 is a logic block diagram of an embodiment of the present invention.

As shown in FIG. 2, the input command processing logic unit 1 is constituted by connecting AND gate chips IC1, IC2 and IC3 and an OR gate chip I1. The malfunction processing logic unit 2 is constituted by connecting AND gate chips IC5 and IC6, an OR gate chip I4, R/S triggers Q1 and Q2, and delay chips T1 and T2. The state processing logic unit 3 is constituted by connecting AND gate chips IC7 and IC8, and OR gate chips I2, I3. The output command generating logic unit 4 is constituted by connecting an AND gate chip IC4 and an OR gate chip I5. The malfunction signal 1-1 of the 6.6 kV switchgear of the transformer is connected to the input end of the gate I1, and two output ends of the gate I1 are respectively connected to the input end of the I5, an input end of the IC4, and an input end of the I4. The blocking signal 1-2 is connected to the input ends of the IC3, IC4, IC5 and IC6. The operator interface signal 1-3 is connected to the input ends of the IC2, IC3 and IC4. Several state feedback signals 3-1 of the position of the 6.6 kV switch of the transformer are respectively connected to the input ends of the I2, I3, IC7 and IC8. The output ends of the I5 and IC4 are connected to the control command signal end 4-1 of the 6.6 kV switchgear of the transformer. The output ends of the Q1, Q2 and 14 are connected to the alarm end 2-1 of the operator interface. The output ends of the IC7 and I3 are connected to the display end 3-2 of the operator interface.

The malfunction signal 1-1 of the 6.6 kV switchgear of the transformer may include a transformer overload protection action signal 1-1-1, a trip signal of the high voltage fuse of the transformer 1-1-2, a zero-sequence protection action signal of transformer cable 1-1-3, a zero-sequence protection action signal of neutral point of transformer 1-1-4, and a disconnecting signal of the trip connection piece 1-1-5. The blocking signal 1-2 may include an open signal 1-2-1 and a close signal 1-2-2. The operator interface signal 1-3 may include a remote position signal 1-3-1 of the remote/local control switch and a DCS control signal 1-3-2. The state feedback signal 3-1 of the position of 6.6 kV switch of the transformer may include a switch-on signal 3-1-1 of the transformer switch, a working position signal 3-1-2 of the transformer switch, a signal 3-1-3 representative of the test switch of the transformer switch being in test position, a switch-off signal 3-1-4 of the transformer switch, a signal 3-1-5 representative of the transformer switch being in test position, and a signal 3-1-6 representative of the test switch of the transformer switch being in normal position. The control command signal end 4-1 of the 6.6 kV switchgear of the transformer includes a switch-on signal 4-1-1 and a switch-off signal 4-1-2.

Figure 3:
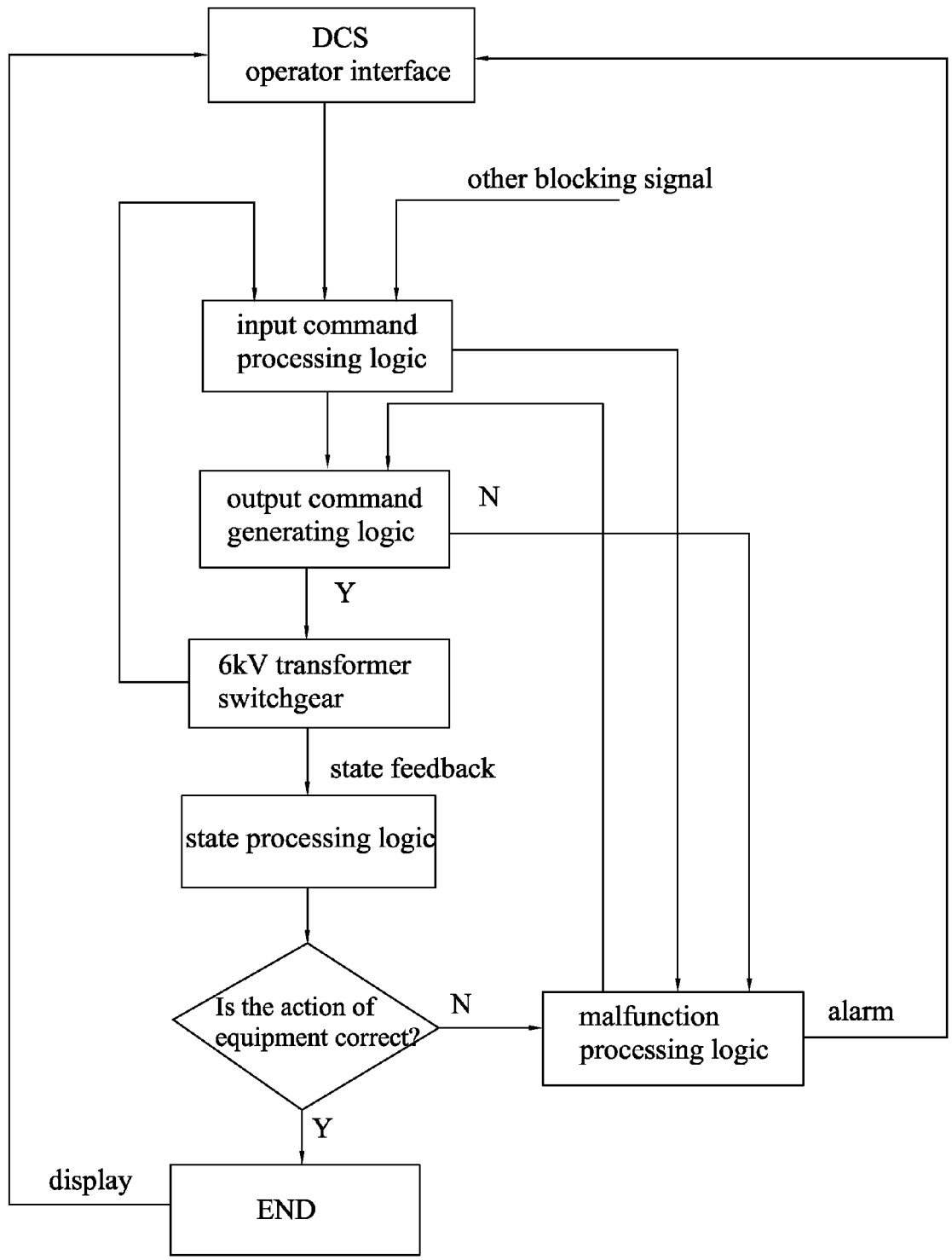
FIG. 3 is an operation flowchart of the present invention.

Referring to FIG. 3, the control process of the present invention is as follows:

1) inputting a command from the DCS interface;
2) determining the logical feasibility in the logic processing unit;
3) generating a logic output to the circuit breaker control circuit of the 6.6 kV transformer switchgear if the command is feasible;
4) outputting a malfunction signal by an alarm which is then transmitted to the interface by the detecting device to give an alarm for resetting or malfunction processing if the command is infeasible;
5) inputting the state feedback signals of the position of the 6.6 kV transformer circuit breaker to the interface via the DCS signal input port.

As shown in FIGS. 1 and 2, the controlling and monitoring of the 6.6 kV transformer switch are both realized in the DCS operator station by the operator, including the remote switch-on and switch-off operation of the 6.6 kV transformer circuit breaker. After the microcomputer integrated protection device mounted in the switchgear detects a malfunction in the electrical circuit, the protection action enables the switching-off of the switch, and enables the feedback signal of the position of the switch, the alarm signal of the mechanical malfunction in the switchgear, and the electrical measurement signal obtained from the CT, PT mounted in the switchgear to be transmitted to the DCS control module via cables, and the DCS control module processes the signals logically according to the operation requirement and then gives a switch-on/switch-off command and a corresponding normal signal or alarm signal.

In this embodiment, the signal input line port of the interface is connected to the output line port of the malfunction processing logic unit. The signal line input port of the malfunction processing logic unit 2 is connected to the signal output line port of the state processing logic unit 3, the signal output line port of the input command processing logic unit 1 and the signal output line port of the output command generating logic unit 4. The signal input line port of the input command processing logic unit 1 and that of the state processing logic unit 3 are connected to the control signal output line port of the field device. The control module for the 6.6 kV transformer switch in nuclear power plant mainly comprises the DCS operating system interface, the input command processing logic unit 1, the malfunction processing logic unit 2, the state processing logic unit 3, the output command generating logic unit 4 and the 6.6 kV switchgear of the transformer.

The input command processing logic unit 1 receives external signals. The signal detecting unit logically determines the feasibility of inputted signals and then provides corresponding processing results for the input command and the malfunction processing, and connected to the output port together with the operation command of the DCS operation interface. The signal line input port is connected to the 6.6 kV switchgear of the transformer and other switchgears relative to the alarm signal or interlocking with the control of the 6.6 kV switchgear.

The output command generating logic unit 4 outputs commands to the control circuit of the 6.6 kV circuit breaker according to the logical decision of the feasibility in the input command logic processing unit.

The position state signal of the 6.6 kV circuit breaker is received and processed by the state processing logic unit 3 and then transmitted to the interface and malfunction processing logic unit.

The signal that is determined as infeasible by the input command logic processing unit and other malfunction signals are outputted by the malfunction processing logic unit 2 through the malfunction alert for the interface alarming, resetting, or malfunction processing.

The transformer 6.6 kV switch is a circuit beaker with the power supply of 6.6 kV mounted in the switchgear and connected to 6.6 kV power bus so as to power the transformer.

The present invention is adapted to the controlling of the switch on 6.6 kV switchgear in the nuclear power plant, and also adapted to the switch controlling of other high or low voltage transformer.

What is claimed is:

1. A distributed control system (DCS) control module for a transformer in nuclear power engineering, comprising:
    an input command processing logic unit;
    a malfunction processing logic unit;
    a state processing logic unit;
    an output command generating logic unit; and
    a 6.6 kV transformer switchgear,
    wherein three input ends of the input command processing logic unit respectively receive a malfunction signal of the 6.6 kV transformer switchgear, a blocking signal and an operator interface signal,
    two output ends of the input command processing logic unit are respectively connected to an input end of the malfunction processing logic unit and an input end of the output command generating logic unit,
    the malfunction processing logic unit has two input ends respectively connected to an output end of the state processing logic unit and an output end of the output command generating logic unit, and has two output ends respectively connected to an input end of the output command generating logic unit and an interface alarm,
    the state processing logic unit has an input end connected to a state feedback signal of the position of the 6.6 kV transformer switchgear, and an output end connected to an interface display, and
    the output command generating logic unit has an output end connected to a control command signal end of the 6.6 kV transformer switchgear.

2. The DCS control module of claim 1, wherein the input command processing logic unit is constituted by connecting AND gate chips (IC1, IC2 and IC3) and an OR gate chip (I1); the malfunction processing logic unit is constituted by connecting AND gate chips (IC5 and IC6), an OR gate chip (I4), R/S triggers (Q1 and Q2), and delay chips (T1 and T2); the state processing logic unit is constituted by connecting AND gate chips (IC7 and IC8), and OR gate chips (I2, I3); the output command generating logic unit is constituted by connecting an AND gate chip (IC4) and an OR gate chip (I5); the malfunction signal of the 6.6 kV switchgear of the transformer is connected to the input end of the gate chip (I1), and two output ends of the gate chip (I1) are respectively connected to the input end of the I5, the input end of the IC4, and the input end of the I4; the blocking signal is connected to the input ends of the IC3, IC4, IC5 and IC6; the operator interface signal is connected to the input ends of the IC2, IC3 and IC4; state feedback signals of the position of the 6.6 kV switch of the transformer are respectively connected to the input ends of the I2, I3, IC7 and IC8; the output ends of the I5 and IC4 are connected to the control command signal end of the 6.6 kV switchgear of the transformer; the output ends of the Q1, Q2 and I4 are connected to the interface alarm; the output ends of the IC7 and I3 are connected to the interface display.

3. The DCS control module of claim 1, wherein the malfunction signal of the 6.6 kV switchgear comprises a transformer overload protection action signal, a trip signal of high voltage fuse of the transformer a zero-sequence protection action signal of transformer cable, a zero-sequence protection action signal of neutral point of transformer, and a disconnecting signal of trip connection piece; the blocking signal comprises an open signal and a close signal; the operator interface signal comprises a remote position signal of the remote/local control switch and a DCS control signal.

4. The DCS control module of claim 1, wherein the state feedback signal of the position of 6.6 kV switch of the transformer comprises a switch-on signal of the transformer switch, a working position signal of the transformer switch, a signal representative of the test switch of the transformer switch being in test position, a switch-off signal of the transformer switch, a signal representative of the transformer switch being in test position, and a signal representative of the test switch of the transformer switch being in normal position.

5. The DCS control module of claim 1, wherein the control command signal end of the 6.6 kV switchgear of the transformer comprises a switch-on signal and a switch-off signal.

* * * * *

UNITED STATES PATENT AND TRADEMARK OFFICE
CERTIFICATE OF CORRECTION

| | | |
|---|---|---|
| PATENT NO. | : 8,229,601 B2 | Page 1 of 1 |
| APPLICATION NO. | : 12/839798 | |
| DATED | : July 24, 2012 | |
| INVENTOR(S) | : Yang et al. | |

It is certified that error appears in the above-identified patent and that said Letters Patent is hereby corrected as shown below:

On the title page item [75], after "Li Yang, Guangzhou (CN); Hongjian Tang, Guangzhou (CN); Shaoyong Wang, Guangzhou (CN); Li Sha, Guangzhou (CN); Huamin Chen, Guangzhou (CN); Chuangshu Xie, Guangzhou (CN); Jingshan Liu, Guangzhou (CN)" insert -- Lan Chen, Guangzhou (CN); Bixiong Luo, Guangzhou (CN) --.

Signed and Sealed this
Twenty-eighth Day of July, 2015

Michelle K. Lee
*Director of the United States Patent and Trademark Office*